US010823855B2

(12) United States Patent
Li et al.

(10) Patent No.: US 10,823,855 B2
(45) Date of Patent: Nov. 3, 2020

(54) TRAFFIC RECOGNITION AND ADAPTIVE GROUND REMOVAL BASED ON LIDAR POINT CLOUD STATISTICS

(71) Applicants: Dalong Li, Troy, MI (US); Andrew Chen, Troy, MI (US)

(72) Inventors: Dalong Li, Troy, MI (US); Andrew Chen, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 106 days.

(21) Appl. No.: 16/194,465

(22) Filed: Nov. 19, 2018

(65) Prior Publication Data

US 2020/0158874 A1    May 21, 2020

(51) Int. Cl.
| | | |
|---|---|---|
| *G01S 17/89* | (2020.01) | |
| *G06T 7/73* | (2017.01) | |
| *G06T 7/521* | (2017.01) | |
| *G06K 9/00* | (2006.01) | |
| *G01S 17/04* | (2020.01) | |

(52) U.S. Cl.
CPC .............. *G01S 17/89* (2013.01); *G01S 17/04* (2020.01); *G06K 9/00825* (2013.01); *G06T 7/521* (2017.01); *G06T 7/73* (2017.01); *G06T 2207/10028* (2013.01)

(58) Field of Classification Search
CPC ..... G01S 5/009; G01S 17/04; G06K 9/00825; G06K 9/00791; G06K 9/00798; G06K 9/00818; G06K 9/6212; G06K 9/3241; G06T 7/73; G06T 7/11; G06T 2207/30252; G06T 2207/30256; G06T 2200/04; G06T 7/521; G06T 2207/20081; G06T 2207/20084; G06T 11/001; G06T 15/08; G06T 7/10

See application file for complete search history.

(56) References Cited

U.S. PATENT DOCUMENTS

| | | | | |
|---|---|---|---|---|
| 5,831,748 | A * | 11/1998 | Tsukada | H04N 1/4074 |
| | | | | 382/169 |
| 8,620,089 | B1 * | 12/2013 | Korah | G06K 9/00201 |
| | | | | 345/419 |
| 8,761,991 | B1 | 6/2014 | Ferguson et al. | |
| 9,221,461 | B2 | 12/2015 | Ferguson et al. | |
| 9,383,753 | B1 | 7/2016 | Templeton et al. | |
| 9,558,564 | B1 * | 1/2017 | Korchev | G06T 7/246 |
| 10,108,867 | B1 * | 10/2018 | Vallespi-Gonzalez | |
| | | | | G01S 17/86 |
| 10,625,748 | B1 * | 4/2020 | Dong | B60W 30/0956 |
| 10,628,671 | B2 * | 4/2020 | Zang | G06K 9/00651 |

(Continued)

*Primary Examiner* — Jingge Wu
(74) *Attorney, Agent, or Firm* — Ralph E Smith

(57) ABSTRACT

An advanced driver assistance system (ADAS) and method for a vehicle utilize a light detection and ranging (LIDAR) system configured to emit laser light pulses and capture reflected laser light pulses collectively forming three-dimensional (3D) LIDAR point cloud data and a controller configured to receive the 3D LIDAR point cloud data divide the 3D LIDAR point cloud data into a plurality of cells corresponding to distinct regions surrounding the vehicle, generate a histogram comprising a calculated height difference between a maximum height and a minimum height in the 3D LIDAR point cloud data for each cell of the plurality of cells, and using the histogram, perform at least one of adaptive ground removal from the 3D LIDAR point cloud data and traffic level recognition.

16 Claims, 4 Drawing Sheets

(56) References Cited

U.S. PATENT DOCUMENTS

| | | |
|---|---|---|
| 2007/0002075 A1* | 1/2007 | Matsuda .................. G06T 5/40 |
| | | 345/592 |
| 2009/0310867 A1 | 12/2009 | Matei et al. |
| 2013/0218472 A1 | 8/2013 | Fu et al. |
| 2014/0118716 A1* | 5/2014 | Kaganovich ............ G06T 7/254 |
| | | 356/4.01 |
| 2016/0093101 A1* | 3/2016 | Benedek ............ G06K 9/00201 |
| | | 345/420 |
| 2016/0104049 A1* | 4/2016 | Stenneth ............ G06K 9/00818 |
| | | 382/155 |
| 2017/0124781 A1* | 5/2017 | Douillard ............... G08G 1/202 |
| 2018/0188043 A1* | 7/2018 | Chen .................. G01C 21/3602 |
| 2018/0203113 A1* | 7/2018 | Taylor ..................... G01S 17/86 |
| 2018/0349715 A1* | 12/2018 | Gupta .................. G08G 1/0141 |
| 2019/0130182 A1* | 5/2019 | Zang ....................... G06K 9/469 |
| 2019/0145765 A1* | 5/2019 | Luo ....................... G06K 9/6274 |
| | | 702/153 |
| 2019/0154439 A1* | 5/2019 | Binder .................... G01S 15/08 |
| 2019/0250626 A1* | 8/2019 | Ghafarianzadeh ... G06K 9/6282 |
| 2019/0251743 A1* | 8/2019 | Koyama .................. H04N 7/18 |
| 2019/0258251 A1* | 8/2019 | Ditty .................. G06K 9/00805 |
| 2019/0258878 A1* | 8/2019 | Koivisto ............. G06K 9/6262 |
| 2019/0266418 A1* | 8/2019 | Xu ..................... G06K 9/00798 |
| 2019/0278292 A1* | 9/2019 | Levinson ............. G05D 1/0251 |
| 2019/0286153 A1* | 9/2019 | Rankawat ................ G06T 7/11 |
| 2019/0286915 A1* | 9/2019 | Patil .......................... G06T 7/55 |
| 2019/0286921 A1* | 9/2019 | Liang ........................ G06T 7/70 |
| 2019/0384303 A1* | 12/2019 | Muller ................... G06N 20/00 |
| 2019/0384304 A1* | 12/2019 | Towal .................. G05D 1/0221 |
| 2020/0026960 A1* | 1/2020 | Park ...................... G05D 1/0246 |
| 2020/0090322 A1* | 3/2020 | Seo ....................... G06K 9/6228 |
| 2020/0118278 A1* | 4/2020 | Mei ...................... G06K 9/6201 |
| 2020/0125845 A1* | 4/2020 | Hess ...................... G05D 1/024 |

\* cited by examiner

TRAFFIC RECOGNITION AND ADAPTIVE GROUND REMOVAL BASED ON LIDAR POINT CLOUD STATISTICS

FIELD

The present application generally relates to vehicle advanced driver assistance systems (ADAS) and, more particularly, to techniques for traffic recognition and adaptive ground removal based on light detection and ranging (LIDAR) point cloud data.

BACKGROUND

Some vehicle advanced driver assistance systems (ADAS) utilize light detection and ranging (LIDAR) systems to capture information. LIDAR systems emit laser light pulses and capture pulses that are reflected back by surrounding objects. By analyzing the return times and wavelengths of the reflected pulses, three-dimensional (3D) LIDAR point clouds are obtained. Each point cloud comprises a plurality of reflected pulses in a 3D (x/y/z) coordinate system). These point clouds could be used to detect objects (other vehicles, pedestrians, traffic signs, etc.). Ground removal is typically one of the first tasks performed on the point cloud data, but conventional ground removal techniques do not account for non-flat surfaces (curved/banked roads, speed bumps, etc.) or scenes having multiple ground surfaces at different levels.

It is also typically difficult, however, to distinguish between different types of objects without using extensively trained deep neural networks (DNNs). This requires a substantial amount of labeled training data (e.g., manually annotated point clouds) and also substantial processing power, which increases costs. This is also a particularly difficult task in heavy traffic scenarios where there are many other vehicles nearby. Accordingly, while such ADAS systems work well for their intended purpose, there remains a need for improvement in the relevant art.

SUMMARY

According to one example aspect of the invention, an advanced driver assistance system (ADAS) for a vehicle is presented. In one exemplary implementation, the ADAS comprises: a light detection and ranging (LIDAR) system configured to emit laser light pulses and capture reflected laser light pulses collectively forming three-dimensional (3D) LIDAR point cloud data and a controller configured to: receive the 3D LIDAR point cloud data, divide the 3D LIDAR point cloud data into a plurality of cells corresponding to distinct regions surrounding the vehicle, generate a histogram comprising a calculated height difference between a maximum height and a minimum height in the 3D LIDAR point cloud data for each cell of the plurality of cells, and using the histogram, perform at least one of adaptive ground removal from the 3D LIDAR point cloud data and traffic level recognition.

In some implementations, the adaptive ground removal comprises determining a dynamic height threshold indicative of a ground surface based on the height differences. In some implementations, the adaptive ground removal further comprises removing or ignoring any 3D LIDAR point cloud data having a z-coordinate that is less than the dynamic height threshold.

In some implementations, the histogram is a feature of a model classifier for traffic level recognition. In some implementations, the controller is further configured to train the model classifier based on known traffic level data. In some implementations, the model classifier is a support vector machine (SVM). In some implementations, the traffic level recognition comprises using the trained model classifier to recognize a traffic level based on the 3D LIDAR point cloud data. In some implementations, the controller is further configured to adjust a field of view (FOV) of the LIDAR system based on the recognized traffic level. In some implementations, the controller is configured to narrow the FOV of the LIDAR system for light traffic levels and to widen the FOV of the LIDAR system for heavy traffic levels.

In some implementations, the controller does not utilize a deep neural network (DNN).

According to another example aspect of the invention, a method of performing at least one of adaptive ground removal from 3D LIDAR point cloud data and traffic level recognition by a vehicle is presented. In one exemplary implementation, the method comprises: receiving, by a controller of the vehicle and from a LIDAR system of the vehicle, the 3D LIDAR point cloud data, wherein the 3D LIDAR point cloud data collectively represents reflected laser light pulses captured by the LIDAR system after the emitting of laser light pulses from the LIDAR system, dividing, by the controller, the 3D LIDAR point cloud data into a plurality of cells corresponding to distinct regions surrounding the vehicle, generating, by the controller, a histogram comprising a calculated height difference between a maximum height and a minimum height in the 3D LIDAR point cloud data for each cell of the plurality of cells, and using the histogram, performing, by the controller, at least one of adaptive ground removal from the 3D LIDAR point cloud data and traffic level recognition.

In some implementations, the adaptive ground removal comprises determining a dynamic height threshold indicative of a ground surface based on the height differences. In some implementations, the adaptive ground removal further comprises removing or ignoring any 3D LIDAR point cloud data having a z-coordinate that is less than the dynamic height threshold. In some implementations, the histogram is a feature of a model classifier for traffic level recognition. In some implementations, the method further comprises training, by the controller, the model classifier based on known traffic level data. In some implementations, the model classifier is an SVM. In some implementations, the traffic level recognition comprises using the trained model classifier to recognize a traffic level based on the 3D LIDAR point cloud data. In some implementations, the method further comprises adjusting, by the controller, an FOV of the LIDAR system based on the recognized traffic level. In some implementations, adjusting the FOV of the LIDAR system comprises narrowing the FOV of the LIDAR system for light traffic levels and widening the FOV of the LIDAR system for heavy traffic levels.

In some implementations, the controller does not utilize a deep neural network (DNN).

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As discussed above, there exists a need for improvement in automated driver assistance (ADAS) systems that utilize light detection and ranging (LIDAR) for object detection. It will be appreciated that the term "ADAS" as used herein includes driver assistance systems (lane keeping, adaptive cruise control, etc.) as well as partially and fully autonomous driving systems. A conventional ADAS for object detection utilizes a deep neural network (DNN) trained by machine learning with training data that is annotated (e.g., human labeled) for every different type of object. This requires a substantial amount of resources, both from a processing standpoint and a labeled training data standpoint, which increases costs.

In a heavy traffic scenario, for example, there will be a large number of objects (i.e., other vehicles) present in the three-dimensional LIDAR point cloud. Having to detect and track each of these objects requires substantial processing power. Additionally, the first processing step for 3D LIDAR point cloud data is typically to identify and remove (or ignore) the ground surface. This is typically performed using a fixed z-coordinate threshold (specific to a particular LIDAR sensor mounting configuration) or plane model segmentation. These conventional techniques, however, fail to account for non-flat ground surfaces (curved/banked surfaces, speed bumps, etc.) or scenes having multiple ground surfaces at different heights.

Accordingly, improved techniques for traffic recognition and adaptive ground removal are presented. These techniques determine LIDAR point cloud statistics (e.g., data point height differences in various distinct cells surrounding the vehicle) and use these statistics to adaptively detect and remove (or ignore) all types of ground surfaces and to recognize different traffic scenarios (heavy traffic, light traffic, no traffic, etc.). The adaptive removal of all types of ground surfaces provides for faster LIDAR point cloud processing and improved ground surface detection and removal accuracy (e.g., reduce false ground surface detections). The detection of different traffic scenarios can be leveraged to control other ADAS features. For example, a heavy traffic scenario may allow the ADAS features to behave more conservatively, and vice versa. In one exemplary implementation, a field of view (FOV) of the LIDAR sensors is adjusted based on the detected traffic scenario. For example, a no traffic or light traffic scenario may allow the LIDAR FOV to be tuned for more accurate long distance sensing, which could be helpful for higher speed driving, such as on a highway.

Figure 1:
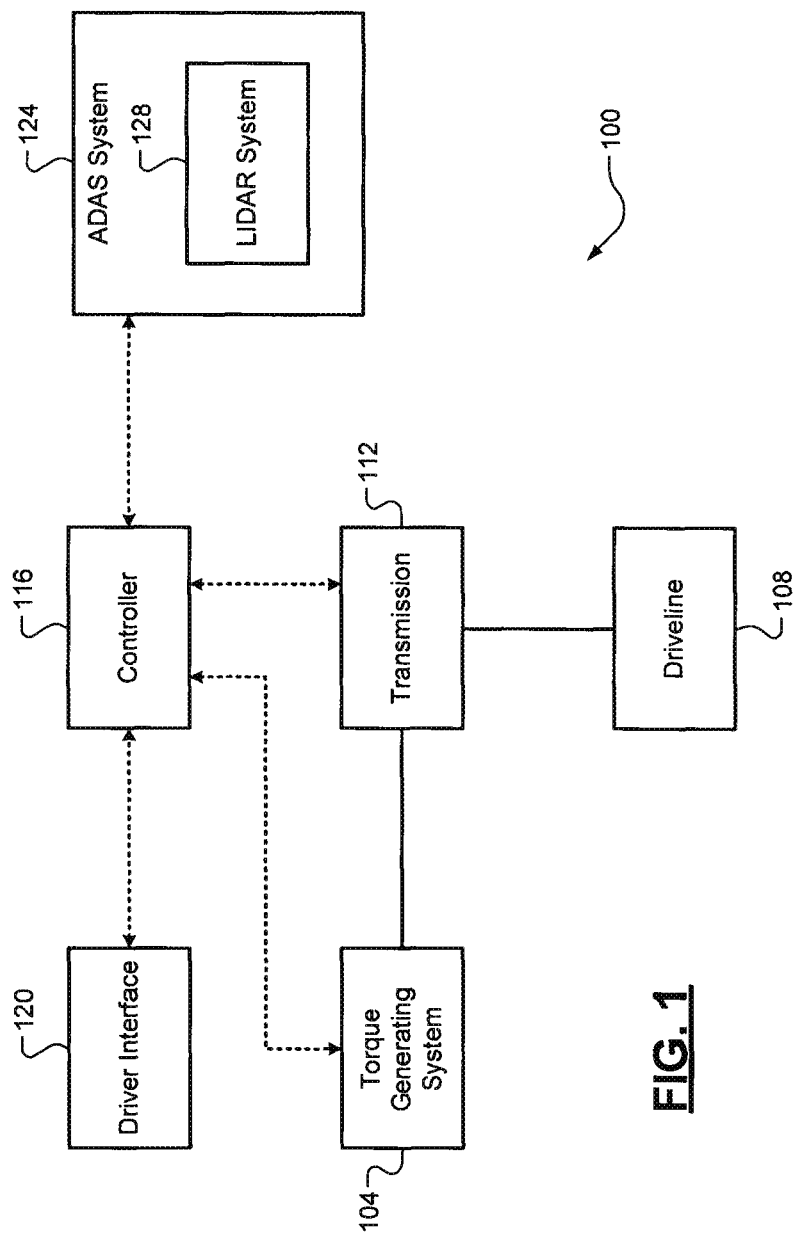
FIG. 1 is a functional block diagram of an example vehicle having an advanced driver assistance system (ADAS) with a light detection and ranging (LIDAR) system according to some implementations of the present disclosure.

Referring now to FIG. 1, a functional block diagram of an example vehicle 100 is illustrated. The vehicle 100 comprises a torque generating system 104 (an engine, an electric motor, combinations thereof, etc.) that generates drive torque that is transferred to a driveline 108 via a transmission 112. A controller 116 controls operation of the torque generating system 104, such as to generate a desired drive torque based on a driver input via a driver interface 120 (a touch display, an accelerator pedal, combinations thereof, etc.). The vehicle 100 further comprises an ADAS 124 having a LIDAR system 128. While the ADAS 124 is illustrated as being separate from the controller 116, it will be appreciated that the ADAS 124 could be incorporated as part of the controller 116, or the ADAS 124 could have its own separate controller. The LIDAR system 128 emits laser light pulses and captures reflected laser light pulses (from other vehicles, structures, traffic signs, ground surfaces, etc.) that collectively form captured 3D LIDAR point cloud data.

Figure 2:
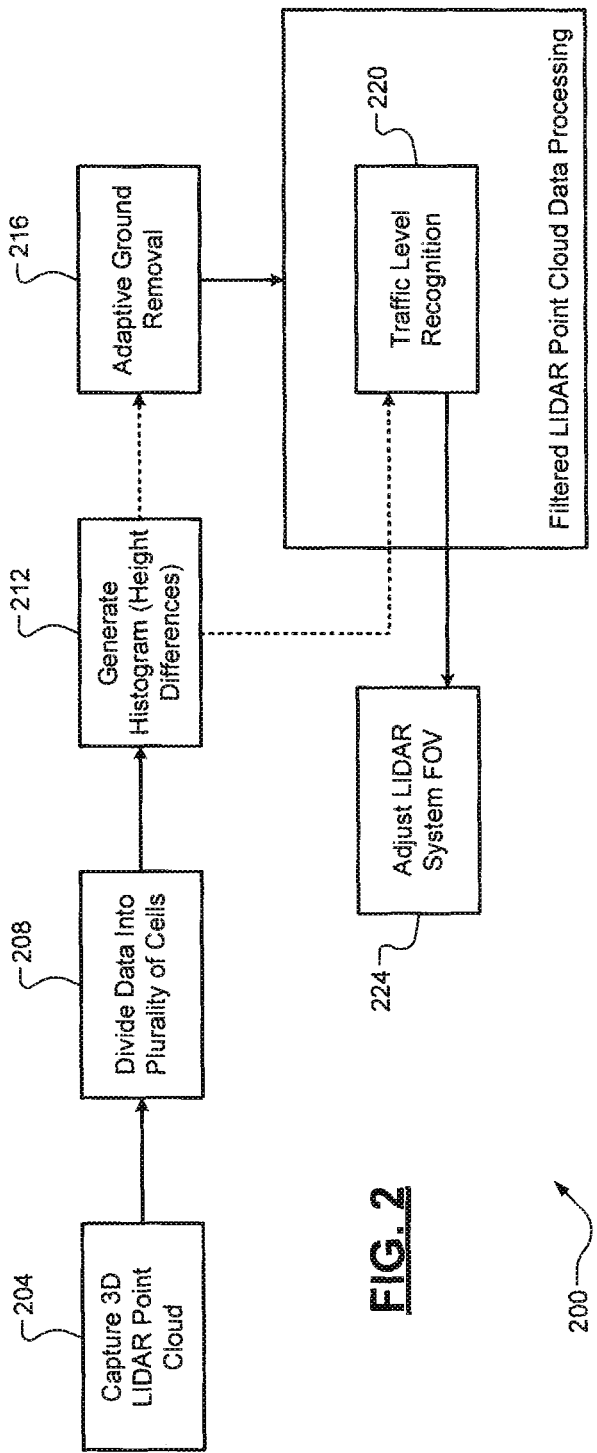
FIG. 2 is a functional block diagram of an example traffic recognition and adaptive ground removal architecture according to some implementations of the present disclosure.

Referring now to FIG. 2, a functional block diagram of an example traffic level recognition and adaptive ground removal architecture 200 is illustrated. It will be appreciated that this architecture 200 could be implemented by the ADAS 124 or the controller 116. At 204, the 3D LIDAR point cloud data is captured using the LIDAR system 128. This could include, for example, analyzing return times and wavelengths of the reflected laser light pulses. The LIDAR system 128 has a FOV setting that specifies horizontal and/or vertical scanning angles. This FOV setting could be adjusted, for example, by the controller 116 via a command to the LIDAR system 128. A narrower FOV produce higher resolution over a smaller field, whereas a wider FOV produces a lesser resolution over a larger field. The narrower FOV could be particularly useful, for example, for long distance scanning, such as during high speed driving, such as on a highway. The wider FOV, on the other hand, could be particularly useful for other operating scenarios, such as low speed driving in crowded environments (parking lots, heavy traffic jams, etc.).

Figure 3:
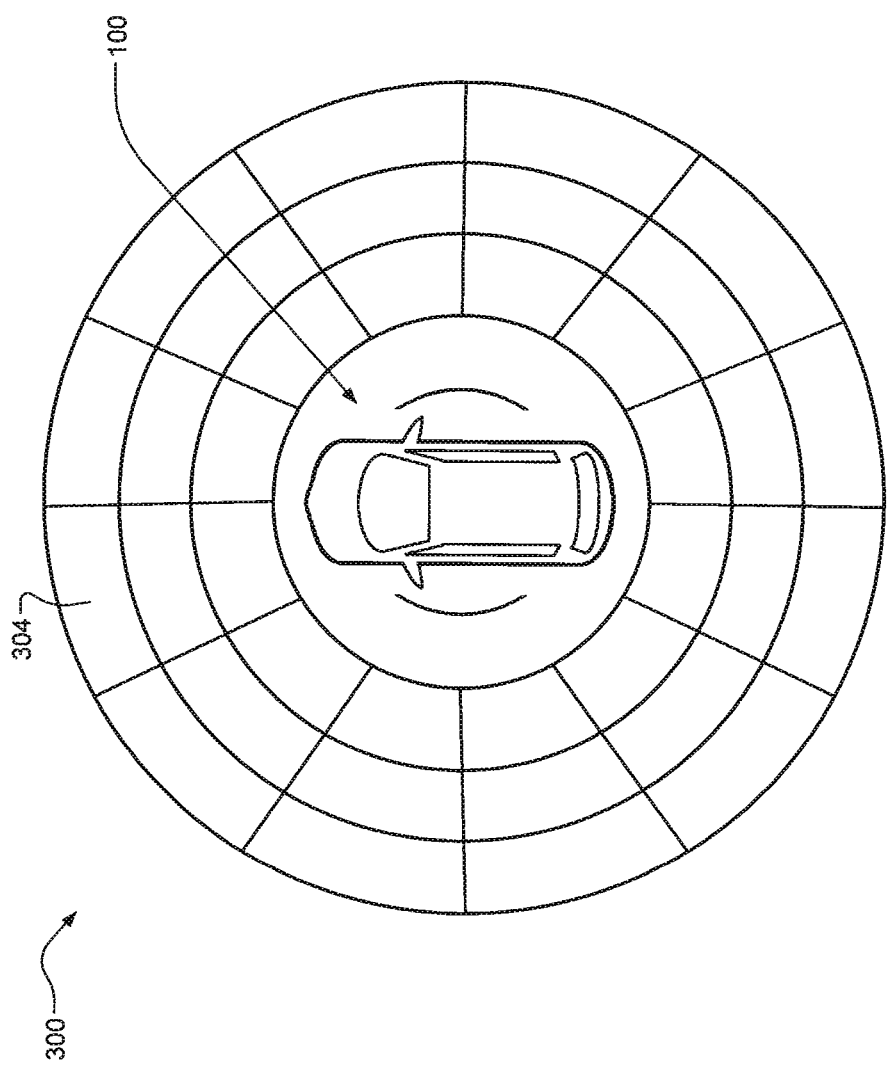
FIG. 3 is an example overhead view of a vehicle and a plurality of cells corresponding to distinct regions surrounding the vehicle for which height differences are calculated using LIDAR point cloud data.

At 208, the 3D LIDAR point cloud data is divided into a plurality of cells, each cell representing a distinct region surrounding the vehicle 100. FIG. 3 illustrates an overhead view 300 of an example plurality of cells 304 surrounding the vehicle 100. In one exemplary implementation, the angle and radius increment between the cells 304 is 2 degrees and 50 centimeters (cm), respectively. It will be appreciated, however, that any suitable division of the 3D LIDAR point cloud data into the plurality of cells 304 could be utilized. Referring again to FIG. 2, a histogram is generated at 212. The histogram includes a height difference between maximum and minimum heights (z-coordinates) of the 3D LIDAR point cloud data for each respective cell. Very small height differences are likely indicative of that 3D LIDAR point cloud data corresponding to a ground surface. The histogram is then used to perform at least one of adaptive ground removal at 216 and traffic level recognition at 220. It will be appreciated, however, that the filtered 3D LIDAR point cloud data (after adaptive ground removal) could be used for processing tasks other than traffic level recognition, such as, but not limited to, object detection and tracking.

For adaptive ground removal, the histogram data is analyzed to determine a height threshold indicative of a ground surface. This height threshold could be dynamic in that it is repeatedly recalculated for different scenes. Any points in the 3D LIDAR point cloud data having heights (z-coordinates) less than this height threshold could then be removed from the 3D LIDAR point cloud data (thereby obtaining filtered 3D LIDAR point cloud data) or otherwise ignored. The removal or ignoring of any 3D LIDAR point cloud data that is likely a ground surface allows for faster processing due to the smaller dataset. This also may facilitate the use of a less expensive controller 116 due to the reduced throughput requirements. As shown in FIG. 2, one example of the processing of the filtered 3D LIDAR point cloud is the traffic level recognition at 220. It will be appreciated, however, that the histogram and the unfiltered 3D LIDAR point cloud data could also be fed directly to the traffic level recognition at 220. The traffic level recognition 220 involves detecting a quantity of nearby objects (i.e., other vehicles) based on the height differences.

In one exemplary implementation, the histogram is a feature of a model classifier for traffic level recognition. This model classifier is much less complex than a DNN as used by conventional methods. One example of the model classifier is a support vector machine (SVM), but it will be appreciated that any suitable model classifier could be utilized. The model classifier is trained using known traffic level data. This known traffic level data could be training histograms that are each labeled with a traffic level. For example, a binary labeling system could be used where each training histogram is labeled as a "1" (e.g., heavy traffic or a traffic jam) or a "0" (e.g., very light traffic or no traffic). The model classifier is then applied to the filtered (or unfiltered) 3D LIDAR point cloud data to recognize a traffic level near the vehicle 100. As previously mentioned, the FOV of the LIDAR system 128 could then be adjusted at 224 depending on the recognized traffic level.

Figure 4:
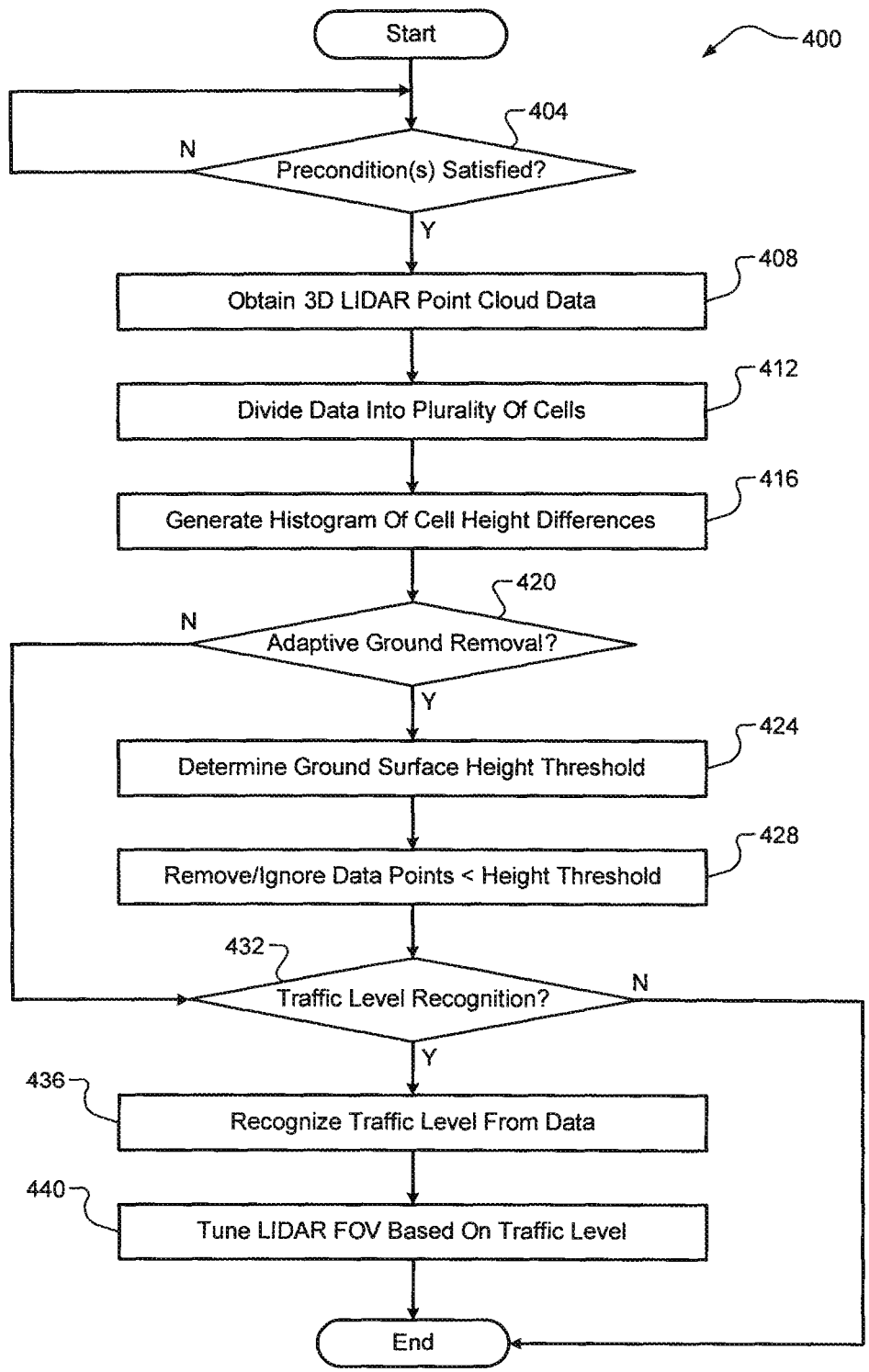
FIG. 4 is a flow diagram of an example method of traffic recognition and adaptive ground removal based on LIDAR point cloud statistics according to some implementations of the present disclosure.

Referring now to FIG. 4, a flow diagram of a method 400 for performing at least one of adaptive ground removal from 3D LIDAR point cloud data and traffic level recognition is illustrated. At 404, the controller 116 optionally determines whether a set of one or more preconditions are satisfied. These could include, for example only, the vehicle 100 being operated (e.g., the torque generating system 104 being activated) and no malfunctions being present. At 408, the controller 116 obtains the 3D LIDAR point cloud data using the LIDAR system 128. At 412, the controller divides the 3D LIDAR point cloud data into a plurality of cells (e.g., cells 304) each indicative of a distinct region surrounding the vehicle 100. At 416, the controller 116 generates a histogram comprising a calculated height difference between a maximum height and a minimum height in the 3D LIDAR point cloud data for each cell. At 420, the controller 116 determines whether adaptive ground removal is to be performed. When true, the method 400 proceeds to 424. Otherwise, the method 400 proceeds to 432.

At 424, the controller 116 determines a dynamic height threshold indicative of a ground surface based on the height differences in the histogram. Typically, most of the height differences are within a certain statistical range and therefore can be considered ground cells. At 428, any data points having a height (z-coordinate) less than this height threshold are removed from the 3D LIDAR point cloud data (to obtain filtered 3D LIDAR point cloud data) or are otherwise ignored. At 432, the controller 116 determines whether traffic level recognition is to be performed. When true, the method 400 proceeds to 436. Otherwise, the method 400 ends or returns to 404. At 436, the controller 116 uses a trained model classifier (e.g., previously trained using the histogram as the model feature) to recognize a traffic level from the filtered (or unfiltered) 3D LIDAR point cloud data. At 440, the controller 116 optionally adjusts a FOV of the LIDAR system 128 based on the recognized traffic level. This could include, for example, narrowing the FOV for no traffic or light traffic levels and widening the FOV for heavy traffic levels. The method 400 then ends or returns to 404.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An advanced driver assistance system (ADAS) for a vehicle, the ADAS comprising:
   a light detection and ranging (LIDAR) system configured to emit laser light pulses and capture reflected laser light pulses collectively forming three-dimensional (3D) LIDAR point cloud data; and
   a controller configured to:
      receive the 3D LIDAR point cloud data,
      divide the 3D LIDAR point cloud data into a plurality of cells corresponding to distinct regions surrounding the vehicle,
      generate a histogram comprising a calculated height difference between a maximum height and a minimum height in the 3D LIDAR point cloud data for each cell of the plurality of cells, and
      using the histogram, perform at least one of:
         i) adaptive ground removal from the 3D LIDAR point cloud data based on a dynamic height threshold indicative of a ground surface, the dynamic height threshold being dynamically determined based on the calculated height differences of the histogram, and
         (ii) traffic level recognition based on a model classifier having a feature trained using the histogram.

2. The ADAS of claim 1, wherein the adaptive ground removal further comprises removing or ignoring any 3D LIDAR point cloud data having a z-coordinate that is less than the dynamic height threshold.

3. The ADAS of claim 1, wherein the controller is further configured to train the model classifier based on known traffic level data.

4. The ADAS of claim 3, wherein the model classifier is a support vector machine (SVM).

5. The ADAS of claim 3, wherein the traffic level recognition comprises using the trained model classifier to recognize a traffic level based on the 3D LIDAR point cloud data.

6. The ADAS of claim 5, wherein the controller is further configured to adjust a field of view (FOV) of the LIDAR system based on the recognized traffic level.

7. The ADAS of claim 6, wherein the controller is configured to narrow the FOV of the LIDAR system for light traffic levels and to widen the FOV of the LIDAR system for heavy traffic levels.

8. The ADAS of claim 1, wherein the controller does not utilize a deep neural network (DNN).

9. A method of performing at least one of adaptive ground removal from three-dimensional (3D) light detection and ranging (LIDAR) point cloud data and traffic level recognition by a vehicle, the method comprising:
   receiving, by a controller of the vehicle and from a LIDAR system of the vehicle, the 3D LIDAR point cloud data, wherein the 3D LIDAR point cloud data collectively represents reflected laser light pulses captured by the LIDAR system after the emitting of laser light pulses from the LIDAR system;
   dividing, by the controller, the 3D LIDAR point cloud data into a plurality of cells corresponding to distinct regions surrounding the vehicle;
   generating, by the controller, a histogram comprising a calculated height difference between a maximum height and a minimum height in the 3D LIDAR point cloud data for each cell of the plurality of cells; and
   using the histogram, performing, by the controller, at least one of:
      (i) adaptive ground removal from the 3D LIDAR point cloud data based on a dynamic height threshold indicative of a ground surface, the dynamic height threshold being dynamically determined based on the calculated height differences of the histogram, and
      (ii) traffic level recognition based on a model classifier having a feature trained using the histogram.

10. The method of claim 9, wherein the adaptive ground removal further comprises removing or ignoring any 3D LIDAR point cloud data having a z-coordinate that is less than the dynamic height threshold.

11. The method of claim 9, further comprising training, by the controller, the model classifier based on known traffic level data.

12. The method of claim 11, wherein the model classifier is a support vector machine (SVM).

13. The method of claim 11, wherein the traffic level recognition comprises using the trained model classifier to recognize a traffic level based on the 3D LIDAR point cloud data.

14. The method of claim 13, further comprising adjusting, by the controller, a field of view (FOV) of the LIDAR system based on the recognized traffic level.

15. The method of claim 14, wherein adjusting the FOV of the LIDAR system comprises narrowing the FOV of the LIDAR system for light traffic levels and widening the FOV of the LIDAR system for heavy traffic levels.

16. The method of claim 9, wherein the controller does not utilize a deep neural network (DNN).

* * * * *